United States Patent Office 3,401,124
Patented Sept. 10, 1968

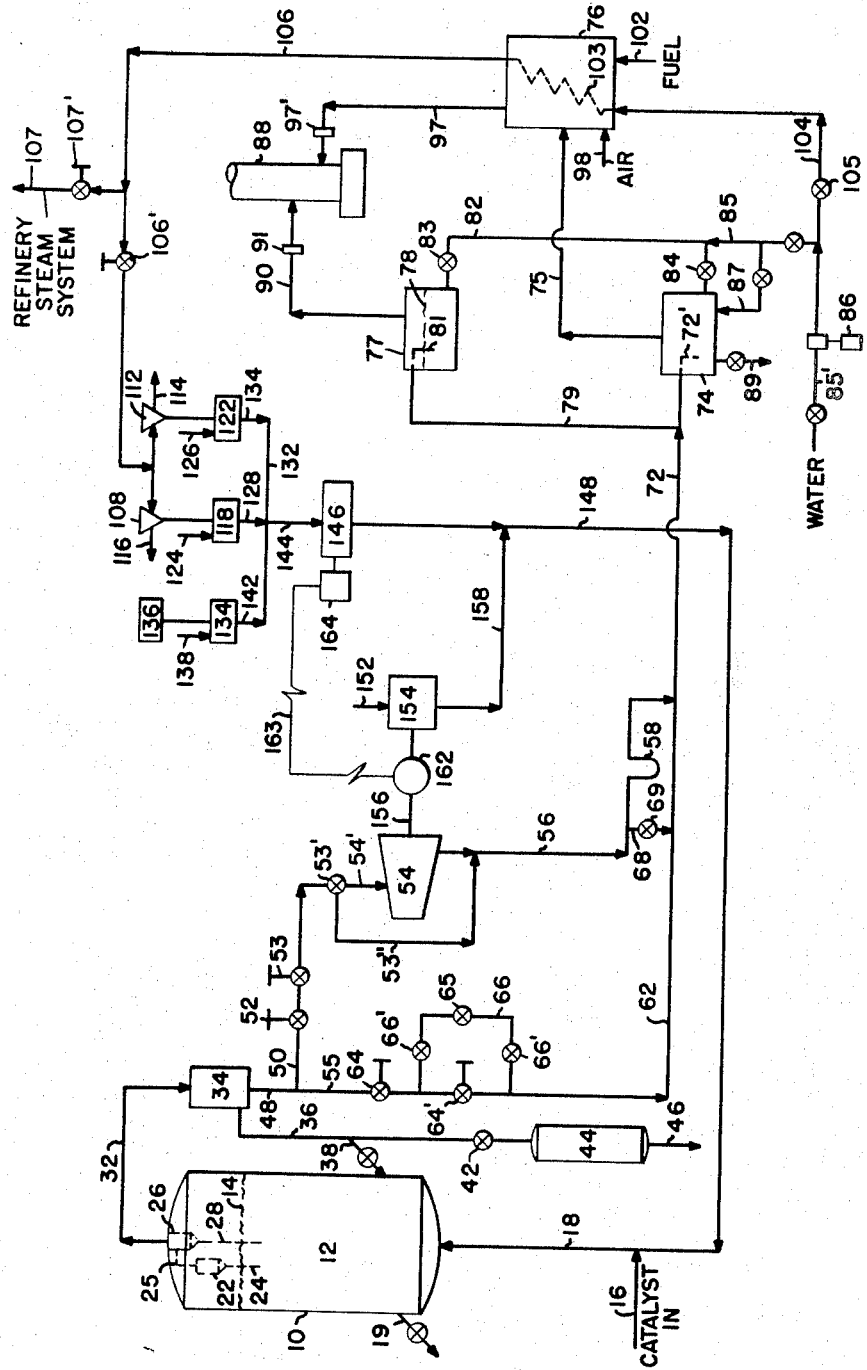

3,401,124
RECOVERING ENERGY FROM FLUE GAS
John E. Goulden, Edison Township, Middlesex County, N.J., assignor to Esso Research and Engineering Company, a corporation of Delaware
Filed Oct. 26, 1964, Ser. No. 406,494
13 Claims. (Cl. 252—417)

This invention relates to recovering energy from flue gas which is under superatmospheric pressure and which contains combustible gas.

More particularly, the invention relates to recovery of kinetic energy from flue gas by expanding the flue gas through a gas expansion engine or turbine to generate useful work and then passing the exit gas at lower pressure from the engine or turbine through a carbon monoxide boiler to burn carbon monoxide and recover maximum sensible and combustion heat from the flue gas. The gas turbine is used to drive an air blower and an induction generator. The electric power from the generator is used in part to compress air in a motor driven air blower and in part to compress gas in another operation by a motor driven gas compressor. When the regenerator overhead flue gas line operates at about 1200° F., 17 p.s.i.g. and a design flow rate of approximately one million pounds per hour, the equivalent available gas horsepower is about 25,000.

This invention is especially adapted for recovering energy from flue gas from a regenerator used in the fluid catalytic cracking of hydrocarbons where the regenerator contains a fluid bed of spent finely divided catalyst solids. The energy recovered from the flue gas is used in part to supply air under pressure to the regenerator. The regenerator is under superatmospheric pressure and the flue gas leaving the regenerator is first passed through dust separating and collecting means for removing most of the entrained fine catalyst particles from the flue gas. Then all or part of the flue gas substantially free of solids is passed through an expansion turbine which drives an air blower and an induction generator.

Then the flue gas at lower pressure is mixed with air to burn carbon monoxide in the flue gas and the mixture burned in a boiler or the like to recover heat preferably in the form of steam under pressure. In some cases it may be necessary to supply fuel to the boiler to raise the carbon monoxide temperature to ignition temperature. All or part of the so-generated steam is used to run one or more blowers for compressing air. Additional air is compressed in a blower driven by an electric motor run by electricity from an outside source such as a public utility.

The compressed air from the blowers just mentioned is combined in a manifold and further compressed in a booster blower to a higher pressure by energy in the form of electricity produced by the induction generator driven by the expansion turbine and supplied to a motor which drives the booster blower. The compressed air from the booster blower and the compressed air from the blower run directly from the turbine by shaft power comprise the air supplied to the fluid catalyst regenerator.

According to the present invention, atmospheric air is compressed to an elevated pressure in the range of between about 25 and 35 p.s.i.g. (pounds per square inch gage), preferably 30 p.s.i.g. The air is heated during compression. The compressed air is passed into the bottom portion of the regenerator to burn off coke or carbonaceous deposits from the fluid catalyst particles. The coke deposits are formed during cracking in the fluid catalytic cracking reactor. The temperature in the regenerator is between about 900° F. and 1250° F. and the pressure in the regenerator is between about 10 and 25 p.s.i.g. Regenerated catalyst is withdrawn continuously from the regenerator and returned to the fluid catalyst reactor.

The products of combustion or flue gas leaving the regenerator include CO and $CO_2$ and also contain entrained finely divided catalyst particles not completely removed by the cyclone separating means located within the regenerator. The amount of CO in the flue gas is between about 5.0 and 10.0 mol percent. The hot flue gas is preferably passed through additional solids separating means which may be located in the regenerator but are preferably located outside of the regenerator to remove most of the entrained fine solid catalyst particles. The last stage of solids separation or fines removal step effectively reduces the solids concentration in the flue gas to below about 40–184 p.p.m. (parts per million). The amount of solids left in the flue gas is sufficient to do only a very limited amount of material damage to the blades of the expander turbine over an extended period of time.

The flue gas at about regenerator temperature and a pressure equal to regenerator pressure less the pressure drop through the cyclone, duct and valves is then passed through the expansion engine or turbine where the temperature and pressure are reduced. The temperature of the flue gas leaving the expansion turbine is between about 850° F. and 1050° F. and the pressure of the flue gas leaving the expansion turbine is between about 0.5 and 5.0 p.s.i.g. The energy or useful work recovered by the expansion turbine is used to supply most of the compressed air to be supplied to the regenerator to regenerate the fluid catalyst therein.

The hot flue gas from the turbine and at least part of the hot flue gas by-passing the turbine (where by-passing is practiced) is passed through one or more water seal pots or large valves. One seal pot is normally empty and water is only introduced into it when it is desired to by-pass the CO boiler. The gas is mixed with air and the mixture either as such or with added fuel is passed through burners to a combustion vessel or CO boiler to burn the carbon monoxide and produce additional heat which is absorbed by water in steam or water tubes to produce superheated steam which is used to run additional blowers for supplying regeneration air under pressure for the regenerator. The flue gas from the boiler passes to the stack.

The carbon burning capacity of the regenerator is between about 60,000 and 70,000 pounds per hour and the amount of air required to burn this carbon is between about 160,000 s.c.f.m. and 190,000 s.c.f.m.

High pressure steam between about $650\#/in.^2$ and $750\#/in.^2$ can be produced in the boiler. High pressure steam of about $700\#/in.^2$ is preferred for the present system. The amount of $700\#/in.^2$ of steam produced by the CO boiler is between about 350,000 and 400,000 pounds per hour net and is more than sufficient to run air blowers to produce a large portion of the compressed air at an intermediate pressure which is then passed through a booster blower to increase the pressure in the air for use as regenerating air to be supplied to the regenerator.

In the drawing, the figure diagrammatically represents one arrangement of apparatus adapted to practice the present invention.

Referring now to the drawing, the reference character 10 designates a vertically arranged cylindrical regenerator vessel having a closed top and containing a fluidized bed of catalyst 12 with a level indicated at 14. Catalyst coming from the reactor (not shown) is passed through line 16 into line 18 containing air under pressure and the mixture is passed through line 18 into the bottom of the regenerator vessel 10. Vessel 10 is preferably provided with a catalyst and/or air distribution grid (not shown) in the bottom of vessel 10 to distribute the air in the bottom of vessel 10 and to fluidize the catalyst solids therein. In the cracking of hydrocarbons in the fluid bed reactor, coke or carbonaceous material is laid down on the catalyst particles. The regenerator functions to remove coke or carbonaceous materials from the catalyst. The finely divided catalyst circulates continuously between the reactor and regenerator. Regenerated catalyst is withdrawn from the regenerator 10 through line 19 and is passed to the reactor (not shown).

The catalyst can be any cracking catalyst such as silica-alumina containing 10–25% by weight of alumina. Other cracking catalysts such as silica-magnesia, silica-alumina-magnesia or other synthetic catalysts, acid treated clays, etc., may be used. The catalyst has a size mostly between about 20 and 80 microns but contains particles larger than 80 microns and smaller than 20 microns. The catalyst to oil ratio by weight going to the reactor may be between about 5 and 15. The temperature in the reactor may be between about 850° F. and 1000° F. The superficial velocity of the gas and vapors passing up through the reactor may be between about 0.5 and 5.0 feet/second to maintain a dense fluidized turbulent fluidized bed of catalyst particles.

The regenerator 10 is at a temperature between about 900° F. and 1250° F. The pressure in the regenerator is between about 15 and 25 p.s.i.g. The superficial velocity of the gas or air passing up through the regenerator 10 is between about 0.5 and 5.0 feet/second to produce a dense turbulent fluidized bed of catalyst particles 12. The regeneration gases or flue gas leaving the fluidized bed 12 contains entrained catalyst fines or solids and these fines or solids are removed by passing the gases through dust separating means such as cyclone separators arranged within the regenerator. As shown in the drawing, primary cyclone separator 22 has dipleg 24 extending below the level 14 of the catalyst bed 12 and top outlet line 25 leading to the secondary cyclone separator 26 having a dipleg 28 like dipleg 24. The separated solids are returned to fluid bed 12 by diplegs 24 and 28. More than one set of primary and secondary cyclone separators may be used.

Regeneration gases at a temperature of between about 900° F. and 1250° F. leave the secondary cyclone separator 26 and the top of the regenerator 10 through line 32. The regeneration gases then are passed through a third solids or fines separating stage 34 which may be a tertiary cyclone separator or other separating means and which is shown as arranged externally to regenerator 10 but which may be internally arranged within the top of the regenerator. The tertiary separation stage is used to reduce the solids or fines content of the flue gases to below about 40–184 p.p.m. so as to minimize erosion damage to the blades of the gas expansion turbine presently to be described.

The solids separated from the gases in tertiary stage separator 34 are withdrawn through line 36 and a portion of the separated material may be returned directly to regenerator vessel 10 through valved line 38 or through a solids classifier (not shown) in line 38 or may be passed through valve 42 in line 36 to spent catalyst hopper or vessel 44 provided with bottom withdrawal line 46 for withdrawal of the separated catalyst from the system. The classifier when used separates fine catalyst from coarse catalyst which may be returned to the system.

The hot regeneration or flue gas leaving third stage separator 34 is passed through line 48 and a major portion thereof is passed through line 50, a suction block or shut off valve 52, a throttle valve 53 and a diversion valve 53' and then through line 54' and expansion turbine 54. The rest or minor part or portion of the flue gas is by-passed from line 48 through line 55 around turbine 54. In passing through the solids separation stages 22, 26 and 34 (and valves 52, 53 and 53') there is some drop in pressure but the regeneration gases are still under superatmospheric pressure of about 15.0 to 20.0 p.s.i.g. and are passed through the expander turbine 54 to recover energy therefrom. The diversion valve 53' opens into by-pass line 53'' which by-passes turbine 54 and discharges into outlet line 56 from turbine 54 for a purpose to be hereinafter described.

The regeneration gases leave turbine 54 through line 56 at a lower temperature of between about 850° F. and 1050° F. and at a pressure between about 0.5 and 5.0 p.s.i.g. and are passed through a sealing means which is shown as a U-shaped leg 58 used for isolating the expander 54 during shutdowns. After shutdown, water is pumped into seal leg 58 to isolate the expander 54. Instead of the U-shaped leg, a water seal tank or a valve may be used at 58. The regeneration gases then join the minor portion of by-passed regeneration gases passing through line 62 after having passed through one or more slide valves 64 and 64'. The slide valves 64 and 64' act as by-passed control valves in conjunction with butterfly valve 65 for turbine 54 and also as pressure reducing valves to reduce the pressure to near that or about that in line 56. Butterfly valve 65 is shown as arranged in by-pass line 66 which by-passes the slide valve 64'. The butterfly valve 65 is in parallel with slide valves 64 and is required to obtain fine and accurate control of back pressure on the regenerator 10 since slide valves 64 and 64' do not easily handle both all of the flue gas from line 48 when the turbine 54 is out of the unit and the small flue gas flow when turbine 54 is producing maximum horsepower. The by-pass line 66 is provided with valves 66' to connect or disconnect the by-pass line 66 with line 55. Butterfly valve 65 is used to control regenerator pressure during expander 54 start up and operation. Instead of valve 64, a fixed orifice may be used.

The mixture of gases in line 72 is between about 850° F. and 1050° F. If desired, a by-pass line 68 having a valve 69 may be provided ahead of U-shaped leg 58 to pass regeneration gases from line 56 to line 62 for passage through line 72 to boiler 76.

A plurality of seal pots is provided for either passing the mixture of flue gases from line 72 to a CO boiler or to the stack. Line 72 leads into lower seal pot 74 which is normally empty or free of water and normally the gas from pot 74 is passed through line 75 into the combustion burner or burners (not shown) and into CO boiler 76. Line 72 has a right angular outlet end or goose neck 72' within pot 74 which is directed downwardly. The other seal pot 77 is arranged at a higher level and is substantially full of water with a level indicated at 78. Gas line 79 leads from line 72 to upper pot 77 and also has a right angular outlet end or goose neck 81 within upper pot 77 which is directed downwardly and is normally submerged below the water level 78 of water therein. With the outlet end 81 submerged in the liquid in upper pot 77, gas is prevented by the back pressure of water from passing from line 72 through line 79 to upper pot 77.

A by-pass line 82 is provided which leads from the lower portion of top pot 77 to the lower portion of lower pot 74 for conducting water to the lower pot 74 when necessary as under emergency conditions requiring a CO boiler 76 shut down. Valve 83 in line 82 leading from upper pot 77 is provided to normally prevent or control flow of water from upper pot 77 to lower pot 74. A valve 84 is provided in the lower portion of line 82 to control flow of water into lower pot 74. When valves 83 and 84 are opened, the water level 78 in upper pot 77 is dropped below the outlet end 81 of line 79 and water flows down through line 82 into the lower seal pot 74. Make-up water from a water treating plant (not shown) is introduced from line 85' by pump 86 and passed through valved line 87 into the lower portion of lower pot 74 or through line 85 and valve 84 into lower pot 74. Valve 83 in line 82 is closed to prevent water from being pumped into top pot 77.

With the upper seal pot 77 emptied of water and with lower pot 74 substantially full of water, the gas from line 72 is passed through line 79 and upper pot 77 and then through top outlet line 90 leading from upper pot 77 into stack 88. If it is later necessary to again fill upper pot 77 and empty lower pot 74, valve 83 is opened and with valve 84 open, lower pot 74 is emptied of water and make-up water added from line 85. Valve 84 is then closed. Or water may be emptied from pot 74 through valved outlet line 89. The valves in lines 89 and 87 and valve 84 in line 82 are then closed and valve 83 in line 82 opened and make-up water is passed from line 85′ through lines 85 and 82 into upper pot 77 to a level indicated approximately at 78 and operation with the CO boiler 76 resumed. A damper valve diagrammatically shown at 91 in line 90 functions at a stack damper under these by-passing conditions.

The combustion gases formed from burning the carbon monoxide and fuel with air in CO boiler 76 are passed out of the boiler through outlet line 97 into stack 88. Outlet line 97 may be provided with valve or shut off means such as a diagrammatically shown slip blank 97′ which is used to isolate the CO boiler 76 from the stack when the CO boiler is to be isolated for maintenance or for an emergency.

The regeneration gas in line 75 at a temperature between about 850° F. and 1250° F. and a pressure between about 1.0 and 5.0 p.s.i.g. still contains combustible material such as carbon monoxide and this is burned in the boiler 76 to recover heat as energy. The heat is used to make high pressure steam in tubes or the like to operate steam turbines as will presently be described. The regeneration gas in line 75 is at a temperature between about 850° F. and 1250° F., preferably about 1050° F. As this temperature is below the ignition temperature of CO, it is necessary to fire the gas and bring it up to between about 1200° F. and 1300° F. Combustion air is pumped through line 98 into the combustion section of boiler 76 (not shown) and fuel such as natural gas, methane, torch oil, gas oil or the like is passed through line 102 into combustion section of boiler 76 (not shown) for admixture with the regeneration gas and air and the mixture then burned in boiler 76. The air is passed through line 98 by a forced draft fan (not shown) or the like supplied by energy from an external source.

The boiler 76 is provided with boiler tubes diagrammatically shown at 103. Water is introduced into the tubes from feedwater pump or pumps 86 through inlet line 104 with valve 105 open and steam under a pressure between about 650 and 750#/in.$^2$, preferably about 700#/in.$^2$, is withdrawn from the boiler and sufficient steam is passed through line 106 and valve 106′ to operate each of steam turbines 108 and 112. The remainder is passed through line 107 and valve 107′ into the refinery 700#/in.$^2$ steam system. The steam leaving the turbines through lines 114 and 116 is still at a relatively high pressure between about 120 and 150 p.s.i.g. and is passed into the refinery steam distribution system.

The steam turbine 108 drives blower 118 and steam turbine 112 drives blower 122. Air at substantially atmospheric pressure is introduced into blower 118 through line 124 and into blower 122 through line 126. The air under a pressure between about 15 and 25 p.s.i.g. leaves blower 118 through line 128 into manifold 132 and leaves blower 122 through line 134 into manifold 132. The air in passing through blowers 118 and 122 has its temperature raised to between about 225° F. and 350° F. These two turbines in the preferred operation produce about one-half of the necessary compressed air at an intermediate pressure below the pressure required to feed the compressed air to the regenerator vessel 10.

To supply another portion, preferably one-quarter of the air necessary to be compressed to an intermediate pressure or level, a third blower 134 is provided which is run by an electric motor 136 supplied by an outside public utility, that is, the energy or electricity required to run blower 134 is not obtained from the regeneration gas or flue gas from regenerator 10. Air at substantially atmospheric pressure enters blower 134 through line 138 and is compressed. Heated compressed air leaves the blower 134 through line 142 to manifold 132. The air is heated in passing through blower 134 and has its temperature raised to between about 225 and 350° F. The blowers 118, 122 and 134 are all of substantially the same size in the arrangement shown in the drawing but other sizes may be used, that is, the blowers need not all be of the same size.

The compressed air is withdrawn from manifold 132 through line 144 at the intermediate pressure and is passed through a booster blower 146 to raise the pressure of the air to between about 25 and 35 p.s.i.g. and the so-compressed air is passed through line 148 and then line 18 as the compressed air feed to the regenerator vessel 10. In the preferred form this amount of air forms about three-quarters of that needed. A by-pass around booster blower 146 from line 144 to line 148 (not shown) may be provided to be used if there is a failure of generator 162 or motor 164 but this results in air at a lower pressure and the capacity of the system is reduced. Additional air at substantially atmospheric pressure is passed through line 152 into blower 154 which is directly driven by shaft 156 driven by expansion turbine 54. The additional air is compressed to the desired pressure between about 25 and 35 p.s.i.g. and leaves the blower 154 through line 158 which empties into line 148 where it is mixed with the remaining compressed air. The air in passing through blower 154 has its temperature raised to between about 225 and 350° F.

An induction generator 162 is mounted between blower 154 and turbine 54 and is also driven by shaft 156 from the turbine 54. With this arrangement the generator 162 can be used as a motor to drive blower 154 when the expander turbine 54 is down or temporarily out of service. The electric public utility furnishes the synchronous excitation or magnetizing current necessary for the induction generator from the bus to which it is connected. In essence, it floats on the refinery power system. The public utility will also furnish back up for the system supplied by the expansion turbine driven generator when the turbine is down. The generator 162 produces electricity which is used in part to run motor 164 which drives booster blower 146 above described. The generator 162 and motor 164 are electrically connected as shown diagrammatically by line 163. The rest of the electricity produced by the generator is used to run a motor which in turn runs gas compressor in the catalytic cracking process but the rest of the electricity can be used to drive other large gas compressors in the catalytic cracking process or it can be fed back into the refinery distribution system for use elsewhere or at the lower voltage levels, namely, 2300 volt and 440 volt at the catalytic cracking unit.

With the present design the expander turbine 54 and the boiler 76 can be removed from service without interruption of the fluid catalytic cracking unit. The induction generator 162 can be used as a motor to drive the shaft driven blower 154 when the expander turbine 54 is shut down and uncoupled.

During normal operations, the expander turbine driven blower 154 would be base loaded and any necessary adjustments to maintain certain air rates are made on the steam driven blowers.

In the present design the expander turbine 54 is started after the steam turbine air blowers 118 and 122 and the motor driven blower 134 and the booster blower 146 both energized from the utility have brought the regenerator on steam. Once the turbine 54 is delivering full horsepower and the induction generator 162 full output, the induction generator 162 is put on the line and the public utility power is backed out.

In the event of an instantaneous loss of the induction generator 162, the diversion valve 53′ immediately bypasses the regeneration gases around the turbine 54 through lines 53", 56 and 72 and into boiler 76. The quick diversion feature is necessitated by the relatively slow response of the slide valves 64 and 64' to open and maintain a stable pressure on regenerator vessel 10. Butterfly valve 65 in parallel with slide valves 64 and 64' is required to gain fine control of back pressure on regenerator vessel 10 since slide valves 64 and 64' do not have a wide rangeability to handle both all the regeneration gases flow (during a time when expander turbine 54 is taken out of operation) and the small regeneration gases flow which results when turbine 54 is producing maximum horsepower.

A scheduled turbine 54 shutdown is accomplished by gradually shutting throttle valve 53 while butterfly valve 65 and the slide valves 64 and 64' are opening to maintain regenerator vessel 10 back pressure. Once the valve transfer has occurred, block valve 52 is closed and a slip is made up at the flange of valve 52 and fitted in between the flange on the pipe and the flange on valve 52. After the shut down turbine 54 has cooled, water is pumped into seal mechanism 58 to block off the back pressure. A slip blank (not shown) is then made up in the exhaust flange of turbine 54 and the turbine is then isolated for maintenance. The procedure is reversed to return turbine 54 to service.

In a specific example, the catalyst circulation rate between the reactor and regenerator is about 120 tons per minute and the catalyst hold up in the regenerator is about 300 tons. The temperature in the regenerator and the flue gas leaving the top of regenerator through line 32 is about 1200° F. and the pressure above the level 14 of the fluid bed 12 of catalyst in the regenerator is about 22 p.s.i.g. The amount of air necessary to fluidize and regenerate the catalyst and passing through line 18 is about 210,000 standard cubic feet per minute. The air is introduced into the regenerator through line 18 under a pressure of about 30 p.s.i.g.

The flue gas leaving the last separator 34 through line 48 contains about 77 to 184 p.p.m. of catalyst and is at about 18.5 p.s.i.g. and at a temperature of about 1200° F. The flue gas in line 48 amounts to about 1 million lbs./hour maximum and this is divided into about 792,000 lbs./hour which is passed through line 50, suction shut off valve 52, throttle valve 53, diversion valve 53' and then through 18,000 horsepower gas expander turbine 54. In passing through the three valves in the suction line, the flue gas pressure drops to about 17 p.s.i.g. and after passing through the turbine the flue gas pressure is about 1.5 p.s.i.g. The flue gas leaving the turbine 54 in line 56 is at a temperature of about 1000° F. The flue gas in line 48 contains about 7.0 mol percent of CO.

The expanded flue gas in line 56 from turbine 54 containing $CO_2$ and CO is passed through U-shaped seal leg 58 and then through lower water seal pot 74 and line 75 to CO boiler 76. Seal pot 74 is used in cooperation with upper seal pot 77 as a seal to isolate CO boiler 76 and to bypass gas from line 72 through upper seal pot 77 and into stack 88 directly, when necessary. The flue gas in line 56 is then mixed with the rest of the flue gas from line 62 after having passed through valves 64 and 64' and butterfly valve 65. The amount of gas passing through line 62 is about 208,000 pounds per hour when 1 million lbs./hr. is available in line 48. The gas in line 62 is at a pressure of about 1.5 p.s.i.g. The combined flue gas is passed through line 72 at a temperature of about 1000° F. to CO boiler 76. Air is added through line 98 and fuel is added through line 102 to the flue gas introduced into the boiler 76 from line 75. If the flue gas in line 75 is at a temperature above about 1200° F., the fuel is omitted—no fuel is added via line 102—as the temperature is sufficiently high to burn the CO in the flue gas in the boiler 76. In burning the CO in the flue gas in boiler 76, heat is produced which is used for the production of steam in the boiler tubes 103. The burned flue gas leaves boiler 76 through line 97 to stack 88.

A slip blank 97' may be used in line 97 to isolate the boiler 76 from stack 88 when by-passing flue gas directly from line 90 to stack 88.

The amount of 700#/in.$^2$ steam produced in boiler 76 is about 400,000 pounds per hour and is used to drive steam turbines 108 and 112 which drive blowers 118 and 122 of 5,000 horsepower each to compress air from atmospheric pressure to an intermediate pressure or level of about 20 p.s.i.g. Each blower compresses about 55,000 standard cubic feet per minute of air. The compressed air is at a temperature of about 275° F. after the compression step.

An additional 55,000 standard cubic feet per minute of air are compressed in 5,000 horsepower blower 138 driven by an electric motor 136 and the electricity is supplied from an external source, namely, a public utility. The air in passing through blower 134 is compressed to about 20 p.s.i.g. and is at a temperature of about 275° F. The compressed air from the blowers 122, 118 and 134 is passed to manifold 132 and then through a 5,000 horsepower booster blower 146 where the air is further compressed to about 30 p.s.i.g. and has its temperature raised to about 325° F. by the compression.

The power for driving the booster blower 146 is supplied by electric motor 164 connected to the blower. The electric power is obtained from a 13,000 horsepower induction generator 162 which is directly driven by turbine 54 in tandem with blower 154. Only a part of the electricity generated by generator 162 is used to drive motor 164 and the rest may be used in other parts of the process or the refinery. The air is compressed from about 20 p.s.i.g. to about 30 p.s.i.g. and leaves the booster blower 146 at this pressure.

A fourth amount of air of about 45,000 standard cubic feet per minute at atmospheric pressure is compressed in centrifugal air blower 154 (5,000 horsepower) to about 30 p.s.i.g. and raised to a temperature of about 300° F. and then passed through line 158 to join the rest of the 30 p.s.i.g. air in line 148. The compressed air passing through line 148 is then passed through line 18 together with spent catalyst particles introduced from line 16 and into the bottom portion of regenerator vessel 10 as the regenerating and fluidizing gas for regenerating the catalyst solids in the regenerator vessel 10.

What is claimed is:

1. A method for recovering energy from hot flue gas under superatmospheric pressure leaving a catalyst regeneration zone and utilizing the recovered energy to supply at least part of the combustion supporting regenerating gas to be supplied to the regeneration zone, which comprises recovering flue gas from a catalyst regeneration zone, passing said flue gas to an expansion turbine, expanding said flue gas to a lower pressure in said turbine to provide power which is used to drive a gas compressor connected to said turbine to supply only a portion of said combustion supporting regenerating gas under a high pressure sufficient to be supplied to said regeneration zone, recovering expanded flue gas from said turbine at an elevated temperature, generating steam with said expanded flue gas, employing steam generated from said expanded flue gas to provide another portion of regenerating gas under an intermediate pressure, utilizing a motor driven by electricity from an external source to drive a gas compressor to compress an additional portion of regenerating gas to said intermediate pressure, combining the compressed regenerating gas obtained from using said generated steam with the compressed regenerating gas obtained from said electrically driven motor, subjecting said combined regenerating gas to compression to said high pressure sufficient to be supplied to said regeneration zone by utilizing a motor driven by electricity generated from energy supplied by said turbine, combining said combined compressed regenerating gas with said first mentioned compressed portion of regenerating gas at said high pressure and utilizing the last mentioned combination of gas as the combustion supporting regenerating gas under high pressure supplied to said regeneration zone.

2. A method for employing a compressor driven by a flue gas expander turbine to supply regenerator gas containing air to a regeneration zone which comprises passing compressed regenerator gas from a compressor to a relatively high-pressure catalyst regeneration zone, recovering a flue gas at an elevated temperature above about 1000° F. and containing carbon monoxide from said regeneration zone, passing a portion of the recovered flue gas at a temperature above about 1000° F. and at a pressure below the pressure of the regenerator gas passed to said regeneration zone to a flue gas expander turbine to generate a portion of the power required to drive a compressor, recovering expanded flue gas containing carbon monoxide from said flue gas turbine at a lower temperature than that of the flue gas entering said turbine, combining the expanded flue gas with another portion of the flue gas recovered from said regeneration zone, burning carbon monoxide contained in the combined flue gases under conditions to generate steam in a steam generating zone, employing at least a portion of said steam to develop power to drive at least one additional compressor to compress a portion of regenerator gas to an intermediate pressure, further compressing the last mentioned additional regenerator gas to a high pressure by utilizing electrical energy developed by said turbine, combining the last mentioned compressed gas at high pressure with regenerator gas compressed to said high pressure by said first mentioned compressor by power developed by said turbine and supplying the combined regenerator gas under said high pressure to said regeneration zone.

3. A method for employing a compressor driven by a flue gas expander turbine to supply regenerator gas comprising air to a regeneration zone which comprises passing compressed regenerator gas from a compressor to a relatively high-pressure catalyst regeneration zone, recovering a flue gas at an elevated temperature above about 1000° F. and containing carbon monoxide from said regenerator zone, passing a portion of the recovered flue gas at a temperature above about 1000° F. and at a pressure below the pressure of the regenerator gas passed to said regeneration zone to a flue gas expander turbine to generate a portion of the power required to drive a compressor to compress only a portion of the regenerator gas to a high pressure, recovering expanded flue gas containing carbon monoxide from said flue gas turbine at a lower temperature than that of the flue gas entering said turbine, combining the expanded flue gas with another portion of the flue gas recovered from said regeneration zone, burning carbon monoxide contained in the combined flue gases under conditions to generate steam in a steam generating zone, employing at least a portion of said steam to develop power to drive at least one additional compressor to compress an additional portion of regenerator gas to an intermediate pressure, compressing in a compressor still another portion of regenerator gas to said intermediate pressure by use of electrical energy supplied from an external source, further compressing to said high pressure the last mentioned compressed regenerator gas and the portion compressed by using electrical energy from an external source by utilizing electrical energy developed by said turbine, combining the last mentioned compressed gas at high pressure with regenerator gas compressed to said high pressure in said first mentioned compressor by power developed by said turbine and supplying the combined regenerator gas at said high pressure to said regeneration zone.

4. A method according to claim 3 wherein the regenerator gas comprises air and wherein one portion of air is fed from the atmosphere as a separate stream to said first mentioned compressor, said steam actuated compressor and said compressor driven by electrical energy from an external source.

5. A method for supplying regenerating gas to a regeneration zone containing fluidized catalyst, which comprises recovering hot flue gas from a regeneration zone, passing at least a portion of the recovered flue gas at a suitably elevated temperature and a pressure less than the pressure of the regenerating gas supplied to said regeneration zone equivalent to the pressure drop of the system and after removal of finely divided solid particles therefrom to a flue gas turbine zone to develop power required to drive a compressor zone directly from said turbine and a second compressor zone by electrical energy produced by a generator run directly by said turbine, utilizing said first compressor zone to compress one portion of regenerating gas to final desired high pressure, recovering expanded flue gas at an elevated temperature from said flue gas turbine, heating the recovered expanded flue gas by burning carbon monoxide contained therein and employing the thus heated flue gas to generate steam in a steam generating zone, passing said steam from said steam generating zone to a steam turbine zone to develop power for compressing to an intermediate pressure an additional and separate amount of regenerating gas, passing said last mentioned compressed additional regenerating gas at said intermediate pressure to said second compressor run by electrical energy for further compressing said additional and separate regenerating gas to said final high pressure, combining the last mentioned compressed regenerating gas at said high pressure and that from said first compressor zone driven directly by said turbine and using the combined stream as the regenerating gas supplied at said high pressure to said regeneration zone.

6. In the process of continuously regenerating spent finely divided cracking catalyst bearing carbonaceous deposits wherein said spent catalyst is continuously introduced into a regeneration zone, fluidizing-combustion air is continuously flowed upwardly through said regeneration zone to form a fluidized bed and carbonaceous deposits are burned to produce a flue gas discharged from the top of the fluidized bed and which contains entrained catalyst, carbon dioxide and carbon monoxide and regenerated catalyst is continuously discharged from said regeneration zone, the improvement of recovering heat and work energy from said flue gas to supply at least a major portion of the combustion and fluidization air requirements of the process by maintaining said regeneration zone at a substantially superatmospheric pressure sufficient to permit regeneration gas expansion in a gas turbine, separating entrained catalyst particles from flue gas leaving said regeneration zone without substantially lowering the flue gas temperature, expanding the resulting clean flue gas substantially at the exit temperature of said flue gas leaving said regeneration zone in an expansion gas turbine and thereby generating shaft power, discharging flue gas from said turbine at reduced pressure and mixing the discharged flue gas with supplemental air, combusting the carbon monoxide within a boiler having fluid-containing heat-transfer walls to produce energy, using the energy to compress one portion of fluidization-combustion air to an intermediate pressure, using the shaft power to compress another portion of fluidization-combustion air to a high pressure and to produce electrical energy which is used to compress said portion of fluidization-combustion air at said intermediate pressure to said high pressure, combining said two portions of compressed fluidization-combustion air at said high pressure and supplying the combined portions as the compressed air to said regeneration zone.

7. A process for recovering energy from catalyst regenerator flue gas leaving a regeneration zone at superatmospheric pressure and at an elevated temperature and containing CO, which comprises passing at least a portion of the flue gas through an expansion engine to recover shaft power, using said shaft power to drive a gas compressor and an induction generator to produce electricity, compressing regenerator air to a desired high pressure in said gas compressor, utilizing at least a portion of said generated electricity to drive a booster compressor for compressing an additional amount of regenerator gas to said desired high pressure, passing exhaust gas from said expansion engine to a CO boiler, adding air to said exhaust gas to burn the CO in the gas and produce steam, utilizing at least a portion of the steam produced to drive at least one steam driven engine which drives a third compressor, driving a fourth compressor with electrical energy from an external source, compressing additional amounts of regenerator gas in said third and fourth compressors and passing the so-compressed regenerator gas at an intermediate pressure as a single stream to said booster compressor to raise the pressure of regenerator gas to said desired high pressure, combining the compressed regenerator gas at said high pressure from said booster compressor and the compressed regenerator gas at said high pressure from said first mentioned gas compressor and passing the combined high pressure regenerator gas to said regenerator zone as the regenerating gas to be used in regeneration of catalysts in said regeneration zone.

8. An apparatus inclding in combination a regenerator vessel, means for introducing gas under pressure to said regenerator vessel, means including a line for removing hot flue gas under superatmospheric pressure from said regenerator vessel and for passing said hot flue gas through an expansion engine to develop power, a by-pass line associated with said line whereby hot flue gas may be by-passed around said expansion engine, a gas compressor, an induction generator, means directly connecting said gas compressor, expansion engine and generator so that power developed by said expansion engine can drive said compressor and said generator, said compressor having a gas inlet and a gas outlet, a motor, means for connecting said motor and said generator whereby electricity generated by said generator can drive said motor, means connecting said motor and a booster compressor having a gas inlet and a gas outlet whereby said motor can drive said booster compressor, means connecting the air outlet of said first mentioned gas compressor and the gas outlet of said booster compressor, a burner, means whereby hot flue gas from said expansion engine and hot flue gas from said by-pass line may be combined and passed into said burner, means for introducing air into said combined stream of hot flue gases to burn combustible material in said gases and produce steam, means for withdrawing steam from said burner, a third compressor, means for utilizing at least a portion a third steam to drive said third compressor to compress gas to an intermediate pressure level, a gas outlet on said third compressor, means for connecting said last mentioned gas outlet with the gas outlet of said booster compressor and means whereby said gas outlet of said booster compressor and said gas outlet of said first compressor are connected with said means for introducing gas under pressure to said regenerator vessel.

9. An apparatus including in combination a vessel, means for introducing gas under pressure to said vessel, means including a line for removing hot gas under superatmospheric pressure from said vessel and for passing said gas through an expansion engine to develop power, a by-pass line associated with said line whereby gas may be by-passed around said expansion engine, a gas compressor, an induction generator, means directly connecting said gas compressor, expansion engine and generator so said gas compressor, expansion engine and generator so that power developed by said expansion engine can be used to drive said compressor and said generator, said compressor having an inlet and an outlet, a motor, means for connecting said motor and said generator whereby electricity generated by said generator drives said motor, means connecting said motor and a booster compressor having an inlet and an outlet whereby said motor can be used to drive said booster compressor, means connecting the outlet of said first mentioned gas compressor and the outlet of said booster compressor, a burner, means whereby exhaust gas from said expansion engine and any by-passed gas are combined and passed into said burner, means for introducing air into said combined stream of gases to burn combustible material in said gases and produce steam, means for withdrawing steam from said burner, a third compressor having a gas inlet and a gas outlet, means for utilizing at least a portion of said steam to drive said third compressor to compress gas to an intermediate pressure level, a fourth compressor having a gas inlet and a gas outlet, a motor for driving said fourth compressor, means from an external source for providing energy to drive said motor, manifold means for combining the outlet of said third compressor and the outlet of said fourth compressor, means for connecting said manifold means with the inlet of said booster compressor, and means whereby the outlet of said booster compressor and the outlet of said first compressor are connected with said means for introducing gas under pressure to said vessel.

10. An apparatus according to claim 9 wherein a fifth compressor similar to said third compressor and in parallel therewith and driven with a portion of said steam is used to compress air to said intermediate pressure level.

11. An apparatus according to claim 9 wherein said gas inlet of said first mentioned gas compressor, said gas inlet of said third compressor and said fourth compressor are open to the atmosphere for the intake of atmospheric air to be compressed.

12. An apparatus for the recovery of energy from hot flue gas from the regenerator vessel of a catalytic cracking unit which includes, in combination a regenerator vessel, means whereby catalyst particles are introduced into said regenerator vessel and removed therefrom, means for introducing air under pressure to said regenerator vessel, means including a line for removing hot flue gas under superatmospheric pressure from said regenerator vessel and for passing said flue gas through an expansion engine to develop power, a by-pass line associated with said line whereby hot flue gas may be by-passed around said expansion engine, a gas compressor, a generator, means directly connecting said gas compressor, expansion engine and generator so that power deveolped by said expansion engine drives said compressor and said generator, said compressor having an air inlet and an air outlet, a motor, means for connecting said motor and said generator whereby electricity generated by said generator drives said motor, means connecting said motor and a booster compressor having an air inlet and an air outlet whereby said motor drives said booster compressor to compress air, means connecting the air outlet of said first mentioned gas compressor and the air outlet of said booster compressor, a burner, means whereby exhaust gas from said expansion engine is passed into said burner, means for introducing air into said burner to burn combustible material in said exhaust gas and produce steam, means for withdrawing steam from said burner, a third compressor having an air inlet and an air outlet, means for utilizing at least a portion of said steam to drive said third compressor to compress air to an intermediate level, means for connecting said last mentioned air outlet with the air inlet to said booster compressor and means whereby the air outlet of said booster compressor and the air outlet of said first compressor are connected with said means for introducing air under pressure to said regenerator vessel.

13. An apparatus for the recovery of energy from hot flue gas from the regenerator vessel of a catalytic cracking unit which includes, in combination a regenerator vessel, means for introducing air under pressure to said regenerator vessel, means including a line for removing hot flue gas under superatmospheric pressure from said regenerator vessel and for passing said hot flue gas through an expansion engine to develop power, a gas compressor, a generator, means directly connecting said gas compressor, expansion engine and generator so that power developed by said expansion engine drives said compressor and said generator, said compressor having an air inlet and an air outlet, a motor means for connecting said motor and said generator whereby electricity generated by said generator drives said motor, means connecting said motor and a second compressor having an air inlet and an air outlet whereby said motor drives said second compressor to compress air, means connecting the air outlet of said first mentioned gas compressor and the air outlet of said second compressor, a burner, means whereby exhaust gas from said expansion engine is passed through said burner, means for introducing air and fuel into said burner to heat the exhaust flue gas and to burn combustible material in said regenerator flue gas and to produce steam, means for withdrawing steam from said burner, and means whereby the outlet of said second compressor and the outlet of said first compressor are connected with said means for introducing air under pressure to said regenerator vessel.

References Cited
UNITED STATES PATENTS

| | | | |
|---|---|---|---|
| 3,076,769 | 2/1963 | Pfeiffer | 252—417 |
| 3,104,227 | 9/1963 | Pfeiffer et al. | 252—417 |
| 2,167,655 | 8/1939 | Houdry et al. | 252—416 X |

OSCAR R. VERTIZ, *Primary Examiner.*

A. GREIF, *Assistant Examiner.*